Aug. 5, 1924.    1,503,928
D. R. TANNER
PULLEY MANIPULATOR
Filed Dec. 28, 1921    2 Sheets-Sheet 2

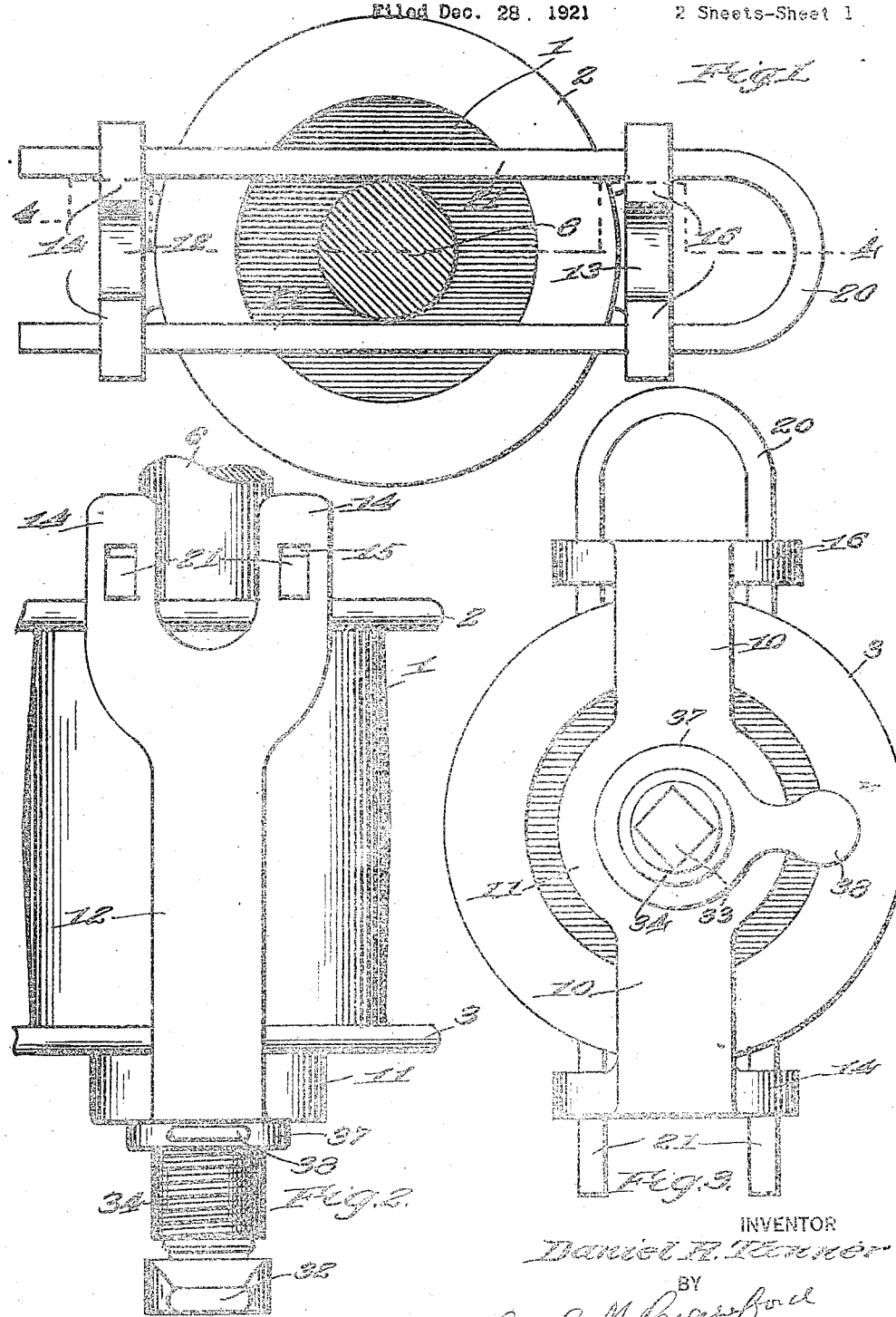

Showing Mark of Drift
When Pulley is pried
off by Old Method.

Applied to
Shaft.

Showing Pried off Pulley

INVENTOR
Daniel R. Tanner
BY
Carl M. Crawford
ATTORNEY

Patented Aug. 5, 1924.

1,503,928

UNITED STATES PATENT OFFICE.

DANIEL R. TANNER, OF LA GRANDE, OREGON.

PULLEY MANIPULATOR.

Application filed December 28, 1921. Serial No. 525,354.

*To all whom it may concern:*

Be it known that I, DANIEL R. TANNER, a citizen of the United States, residing at La Grande, in the county of Union and State of Oregon, have invented certain new and useful Improvements in Pulley Manipulators, of which the following is a specification.

This invention relates to improvements in means for withdrawing a pulley from its shaft and later restoring the pulley to its working position onto said shaft.

The device of my invention is particularly adapted for withdrawing or extracting pulleys mounted upon conical arbors or shafts, such as in wood planing machines where keys and sets screws are not employed. In this manner of mounting or fixing a pulley, anchorage is effected by reason of the very tight frictional engagement of the conical bore of the pulley with the conical arbor. Means such as a nut on the end of the arbor, is employed for normally retaining the pulley in a fixed position on the arbor. By reason of the very firm and secure anchorage of the pulley, it is a very difficult and laborious effort to remove the pulley, which removal may frequently be necessary.

Now it is the primary object of this invention to provide a device whereby this kind of anchored pulley may be very quickly and easily removed without in any way injuring the flanges of the latter. In the most improved embodiment, my invention includes mechanism for tightly gripping the pulley and means co-acting with said mechanism and upon the shaft for loosening the pulley.

In the preferred construction, wrench means is employed for action upon the nut by means of which the pulley is normally retained in position, such action being a turning off movement of the nut with means for transmitting the resultant thrust to the pulley in such a manner that the latter will be loosened as the nut is turned off.

One of the most important features of this invention resides in the means for withdrawing a pulley without in any way disrupting or altering what is called the "shaft center," which on this class of arbor is a female center. In this improved construction, the thrust for withdrawing the pulley, while imposed longitudinally of the shaft, is sustained thereby in such a manner that the female shaft center is not only protected from injury, but also in such manner that the metal of the pulley is not in any way disturbed, hence the bore of the latter is always true to the periphery. Further, by retaining the female center intact, the shaft can be turned down true in a lathe when mounted on the male centers of the latter.

The type of pulley for which this invention is designed, is a web pulley, and different manufacturers not only make the web of different thickness but they also locate the web at different distances from the outer end of the pulley. Therefore, to make the device of my invention universally applicable to all makes of pulleys, I provide adjustable means whereby the wrench portion of my invention may be readily advanced to such a position that it can coact with the nut irrespective of the location of the nut from the outer end of the pulley.

In the most improved form of my invention, this adjustment means performs an additional function which consists in acting as an interposed abutment for transmitting the turning off thrust from the nut to the mechanism which grips the pulley.

My invention also includes a novel form of yoke mechanism for gripping the pulley in such a manner as not to in any way injure the flanges, or any part of the pulley, and in the preferred construction, said mechanism grips the pulley endwise of the latter and in such a manner as mainly to impinge against the annular heel portions of the pulley flanges.

The said yoke mechanism is somewhat enlarged with respect to the maximum diametrical portion of the pulley so as to take pulleys of different sizes, and an important and useful function performed by the wrench device is that when it engages the nut, it serves to center the pulley with respect to the yoke mechanism.

In addition to loosening and withdrawing a pulley from a conical arbor, the device of my invention also functions as a wrench to apply and restore the pulley onto its arbor in the initial tight anchorage position.

The device of my invention has many other novel features and objects which will be more fully described in the accompanying drawings and will be more particularly pointed out in and by the appended claims.

In the drawings:—

Figure 1, is a sectional view on line 1—1 of Figure 4.

Figure 2, is a view in elevation looking from the left of Figure 1.

Figure 3, is a bottom plan view looking from the lower end of Figure 2, with the hand bar omitted.

Like characters of reference designate similar parts throughout the different figures of the drawings.

Figure 4:
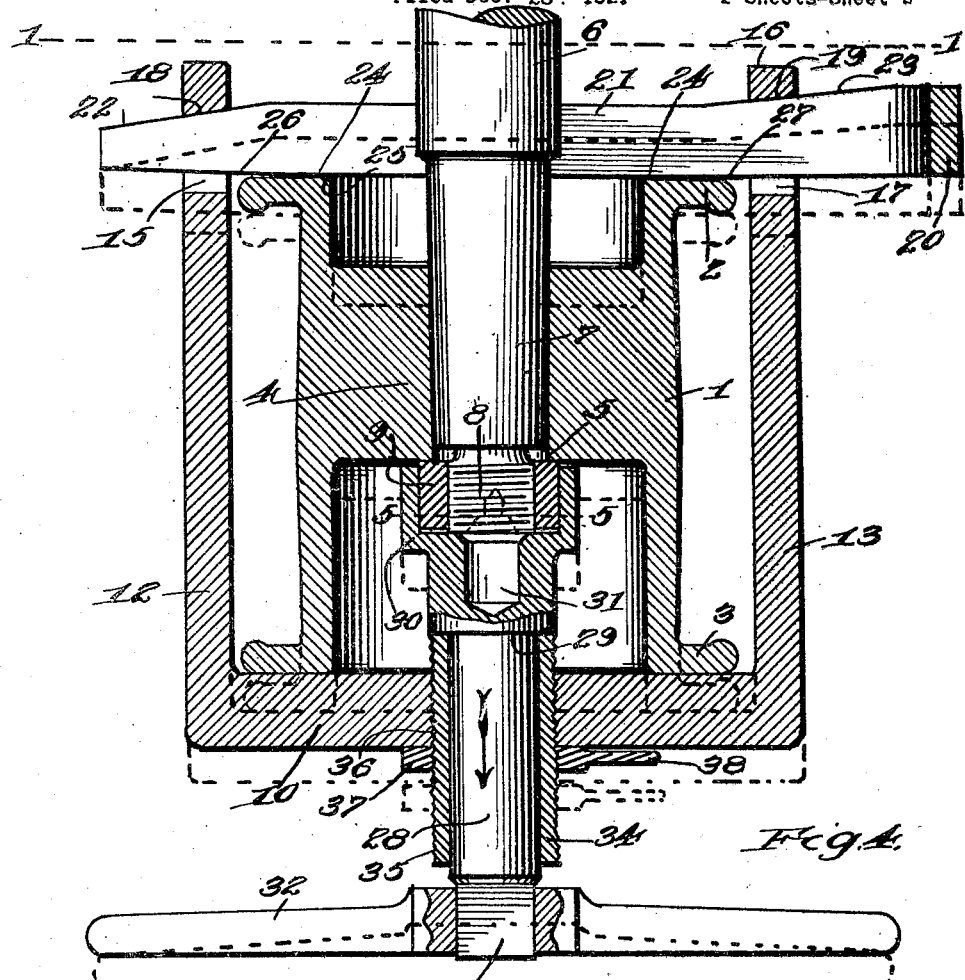
Figure 4, is a sectional view on line 4—4 of Fig. 1.

As illustrated, 1 designates a web pulley having a belt flange 2, at its inner end and a like flange 3, at its outer end. The pulley has a web 4 provided with a conical bore 5. It will be noted that the web 4 is nearer to the inner than the outer end of the pulley, and different manufacturers locate the web at different distances. This statement will be more clearly informative during a later description of a certain novel portion of the device. An arbor or shaft 6 has a conical or tapered end 7 onto which the pulley bore 5 is designed to tightly fit. The tapered end 7 terminates in a reduced threaded end 8. A nut 9 is turned onto the threaded end 8 and impinges against the web 4, or rather its outer face, to normally hold the pulley in position on its shaft. However, the nut additionally functions as a tightener for the pulley since this nut, when turned home, serves to securely telescope the pulley bore into a frictionally and absolutely non-rotative position onto its shaft. The foregoing pulley and shaft construction is old and well known but it may be pointed out that great difficulty is encountered in removing this type of pulley, or any type of pulley, from a conical shaft. Wedging and hammering against the inner end of the pulley is very likely to injure the latter but heretofore no other means, to my knowledge, has been employed. A further objection to the old expedient is the fact that it is time consuming and thereby keeps the machine idle for an unnecessary period.

I will now describe that part of the disclosure which constitutes the device of my invention, reference first being made to my improved frame or yoke mechanism for application to the pulley to be clamped thereon while the pulley is still tight on the shaft.

My improved yoke comprises a bight portion 10, adapted to rest against the outer flange 3, of the pulley. Said bight has a centrally disposed enlargement 11, for a purpose which will later appear. Limbs 12 and 13 extend from the bight 10 lengthwise or alongside of the periphery of the pulley and slightly beyond the inner flange 2. Limb 12 is bifurcated and the forked ends 14 thereof are provided with openings 15. Similarly, limb 13 is forked at 16 and is provided with openings 17. The inner ends 18 and 19 of the openings 15 and 17, respectively, are somewhat inclined to form wedge or clamping elements. A clamping or wedge member is provided which is preferably U-shaped, the bight thereof being indicated at 20, and the limbs at 21. The limbs 21 are provided with pairs of inclined or wedge portions 22 and 23 for respective engagement with the inclined portions 18 and 19 so that when the U-shaped clamping bar is forced to the left of Figure 4, the outer edge 24 will tightly impinge against the annular heel 25 of the inner flange 2. The limbs 21 are slightly curved or cut away at 26 and 27 so as not to engage the peripheral outer portions of the flange 2. Thus by this construction the wedge bar cannot injure the outer portions of the flange. It will now be clear that when the wedge bar is driven tightly into position, the pulley will be securely anchored in the yoke mechanism between the bight 10 and the limbs 21. By making the clamping bar U-shaped, I am enabled to locate the limbs 22 in spaced relation thereby impinging the pulley at points laterally of the center thereof thereby obtaining a firmer anchorage and avoiding interference with the shaft.

Reference will next be made to the wrench means which coacts with the nut 9 and frame mechanism to loosen the pulley.

A wrench spindle 28 extends through and is rotatable in enlargement 11, of the bight 10, and is provided with a shoulder 29. The spindle 28 terminates in a wrench socket 30 having a bore shaped to exteriorly telescope nut 9. The spindle is provided with a socket bore 31 for preventing any injury to the shaft center of arbor 7. A handle bar 32 is fitted upon the polygonal end 33 of spindle 28 to permit the operator to turn said spindle.

I will next describe the novel means whereby the wrench socket may be advanced into engagement with the nut irrespective of the distance between the outer face of the web and the outer end of the pulley, and I will also describe the manner in which said means functions to transmit the turning off thrust from the nut to the yoke mechanism.

An adjusting sleeve 34 is provided with a smooth cylindrical bore telescoping the spindle 28 with a slight working clearance and having its inner end engaging shoulder 29. Sleeve 34 is exteriorly threaded at 35 to engage corresponding threads 36 in a like bore in enlargment 11. A lock nut 37 having a projection 38, to facilitate its manipulation, is turned onto the sleeve 34 and is adapted to engage the bight 10 when in a locking position.

It will now be clear that when the spindle 28 is rotated to turn off nut 9, that the thrust on spindle 28 will be outwardly, as indicated by the arrow in Figure 4. This outward thrust is transmitted from the shoulder 29 to the sleeve 34, and from the latter to the bight 10 of the frame mechanism. Thus as the nut 9 is loosened, the frame mechanism will correspondingly loosen the pulley endwise off from its conical arbor. After the pulley has been moved off to such an extent as to become loose, then the entire apparatus, as shown in Figure 4, can be manually pulled outwardly to completely remove the pulley from the arbor, after the nut 9 has been completely turned off from the threaded end 8.

It will now be clear that when the socket 30 is engaged with the nut 9, the frame mechanism will be centered on the pulley. In practice, the device is centered on the pulley with the socket 30 engaging the nut 9 before the clamping bar is inserted in the yoke openings. Any adjustment of the sleeve 34 may be readily effected after the device is in position as shown in Figure 4. Usually, the pulleys of all the planers of a single mill will be of the same size and no adjustment other than the initial adjustment will have to be made. The dotted lines in Figure 4, illustrate the position of the parts during loosening action.

It will now be clear how the wrench portion may be employed to tighten the pulley onto the shaft, it merely being necessary to turn the nut home on the end 8, in which operation the frame does not necessarily function, as it may be entirely omitted in the restoring operation. In other words, after the pulley has been removed, the frame can be detached therefrom. By merely removing the handle bar, the spindle 28 may be slipped out of the sleeve 34. Then after the pulley has been again mounted on the conical arbor, the socket 30 may be applied to the nut and the handle bar 32 applied to the spindle 38, whereupon the pulley may be tightened by turning the nut 9 to a final position.

It will now be clear that while I exert pressure on the shaft to remove the pulley, still, such pressure is exerted circumferentially of the shaft center thereby protecting the latter from any injury. In the present form of the invention; this is accomplished by imposing the thrust directly and only on the nut 9. Furthermore, the thrust is applied symmetrically of the pulley so that in withdrawing the same the bore of the pulley cannot be forced out of true.

Figure 6:
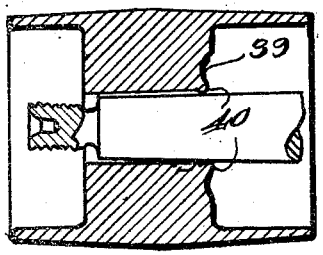
Figure 6, is a sectional view of a pulley showing the mark of drift occurring in the old method of removing a pulley.
Figure 5:
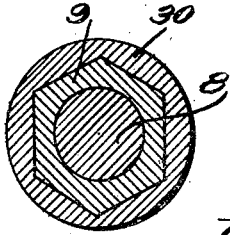
Figure 5, is a sectional view on line 5—5 of Fig. 4.
Figure 7:
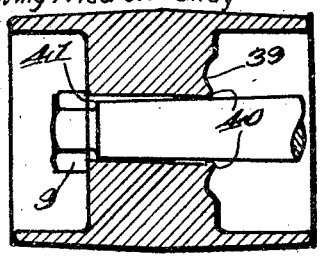
Figure 7, illustrates in exaggerated form the cross sectional appearance of a pulley after having been removed in the old way, and illustrating how it appears when applied to the shaft with the nut turned home.

The foregoing will be more graphically understood by reference to Figures 6 and 7, which show the results of the old method of removing the pulley. In Figure 6, 39 designates the mark of drift of the metal due to hammering thrust in removing the same. It will seem that the metal is upset at 40 thereby getting the bore of the pulley out of true with the periphery. Figure 7 illustrates, in slightly exaggerated form the cross-sectional appearance of the pulley after the nut has been turned home. Note the space 41 which is the direct result of the bore of the pulley getting out of true, or in other words getting out concentricity with the periphery of the pulley. In a high speed machine like a wood-planer, the result of vibration from a pulley in this condition would be disastrous. Therefore it will now be clear that I have provided means to avoid this defective action, and the avoidance is due to the fact that the stress on the pulley is applied symmetrically, and also to the fact that the stress on the shaft is not only applied concentrically about the shaft center to avoid injury thereto, but also to the fact that the stress on the shaft is imposed in exact alinement with the longitudinal axis of the shaft.

It is believed that my invention will be fully understood from the foregoing description, and while I have shown one specific embodiment, I do not wish to be limited thereto except for such limitations as the claims may import.

I claim:

1. As a means of withdrawing a pulley endwise off from its shaft with a nut on said shaft for normally retaining the pulley on said shaft, a yoke frame for engaging the pulley, and means for turning off said nut and engaging said frame whereby as the nut is turned off said frame will withdraw said pulley.

2. As a means of withdrawing a pulley endwise off from its shaft with a nut on said shaft for normally retaining said pulley on said shaft, a yoke frame for engaging the pulley, and means having shouldered and swivelled engagement with said frame for turning off said nut and withdrawing said pulley as said nut is turned off.

3. As a means of withdrawing a pulley endwise off from its shaft with a nut on said shaft for normally retaining said pulley on said shaft, a yoke frame engaging said pulley, and means for turning off said nut and having shouldered engagement with said nut and frame whereby said pulley will be withdrawn as said nut is turned off.

4. As a means of withdrawing a pulley endwise off from its shaft with a nut on said shaft for normally retaining said pulley on said shaft, a yoke having its bight adapted to engage the outer end of said pulley and its limbs extending alongside said pulley and past the inner end thereof and having openings, a clamping bar extending through said openings and engaging the inner end of said pulley to tightly grip the yoke onto said pulley, and means swivelled and shouldered in the bight of said yoke for turning off said nut and withdrawing said pulley as said nut is turned.

5. As a means of withdrawing a pulley endwise off from its shaft, a yoke having its bight adapted to engage the outer end of the pulley and its limbs extending alongside said pulley and past the inner end thereof and having openings therein, a clamping bar extending through said openings and having its pulley engaging face curved to restrict engagement of said bar with only the heel portions of said pulley to thereby protect the flange thereof, and means coacting with the bight of said yoke for exerting thrust endwise of said shaft to withdraw said pulley.

6. As a means of withdrawing a pulley endwise off from its shaft, a yoke having its bight adapted to engage one end of the pulley and its limbs extending alongside said pulley and beyond its remaining end and having openings with inclined portions, a bar extending through said openings and engaging that end of the pulley remote from the bight end of said yoke, and said bar having inclined portions for wedge engagement with the inclinded portions of said openings to wedge clamp said yoke onto said pulley, and means coacting with the bight of said yoke for exerting thrust endwise of said shaft to withdraw said pulley.

7. As a means of withdrawing a pulley endwise off from its shaft, a frame mechanism for attachment to the pulley, and said mechanism having means coacting with the shaft for centering said mechanism on said pulley and adapted to exert pressure on said shaft to withdraw said pulley.

8. As a means of withdrawing a web pulley from its shaft with a nut on said shaft normally engaging the pulley web to retain the pulley on the shaft, a frame mechanism adapted to grip the pulley, means coacting with said mechanism for turning off the nut and withdrawing the pulley, and a device adjustable on said mechanism to advance said means into engagement with said nut irrespective of the location of the web with respect to the outer end of the pulley.

9. As a means of withdrawing a web pulley from its shaft with a nut on said shaft for normally engaging said web to retain said pulley on said shaft, mechanism adapted to grip the pulley and having means for turning off the nut, and a device adjustable on said mechanism for advancing said means into engagement with the nut irrespective of the location of said web with respect to the outer end of the pulley and transmitting turning off thrust from said nut to said mechanism to withdraw said pulley.

10. As a means of withdrawing a web pulley from its shaft with a nut on said shaft engaging the web to normally hold said pulley on said shaft, a frame mechanism adapted to grip said pulley, a wrench spindle turnable in said mechanism and having a wrench portion for engagement with said nut to turn off the latter, an adjusting sleeve exteriorly telescoping said spindle and having shouldered engagement therewith and having threaded engagement with said mechanism to advance the wrench portion into engagement with said nut irrespective of the location of the web with respect to the outer end of the pulley and said sleeve transmitting turning off thrust to said mechanism to withdraw said pulley as said nut is turned off.

11. As a means of withdrawing a web pulley from its shaft with a nut on said shaft engaging said web to normally hold said pulley on said shaft, a frame mechanism adapted to grip said pulley, a wrench spindle turnable in said mechanism and having a wrench portion for engagement with said nut to turn off the latter, an adjustable sleeve exteriorly telescoping said spindle and having shouldered engagement therewith and having threaded engagement with said mechanism to advance the wrench portion into engagement with said nut irrespective of the location of said web with respect to the outer end of the pulley and said sleeve transmitting turning off thrust to said mechanism to withdraw said pulley as said nut is turned off, and a lock nut threaded on said sleeve and engaging said mechanism.

12. As a means of withdrawing a web pulley from and restoring it onto a shaft having a nut for engagement with the web of the pulley, mechanism adapted to grip the pulley, and means coacting with the nut and said mechanism to withdraw the pulley and coacting with said nut to tighten said pulley onto said shaft.

13. As a means of withdrawing a pulley from and later tightening it onto its shaft, mechanism adapted to grip the pulley, and means coacting with said mechanism and exerting a thrust on the shaft to withdraw the pulley or exerting a thrust on said shaft to tighten the pulley.

14. As a means of withdrawing a web pulley endwise off from its shaft with a nut on said shaft for engagement with the web to normally retain said pulley on said shaft, a yoke having its bight engaging the outer end of the pulley and its limbs extending alongside said pulley and past the inner end thereof and terminating in pairs of openings, a U-shaped clamping bar having its limbs extending through said openings on opposite sides of said shaft and coacting with said limbs to tightly clamp on said pulley, an adjusting sleeve threaded in the bight of said yoke, a wrench spindle journalled in said sleeve and having shouldered engagement therewith and provided with a socket for engagement with said nut on one end of said spindle, and a bar on the other end of said spindle for turning the latter to turn off said nut and withdraw said pulley.

15. As a means of withdrawing a web pulley endwise off from a conical arbor with a nut on the end of said arbor, frame mechanism for symmetrically gripping the pulley, and wrench means adapted to act on the nut to unscrew the latter and coacting with said mechanism to transmit the thrust thereto, whereby the alined action of said mechanism and means with the axis of said arbor will prevent injury to the pulley bore and shaft center.

In testimony whereof I hereby affix my signature.

DANIEL R. TANNER.